United States Patent [19]

Zgraggen

[11] 4,128,777
[45] Dec. 5, 1978

[54] ARMATURE CORE WRAPPED WITH IRRADIATION CURABLE GLASS BANDING

[75] Inventor: Martin A. Zgraggen, Erie, Pa.

[73] Assignee: General Electric Company, Schenectady, N.Y.

[21] Appl. No.: 726,357

[22] Filed: Sep. 24, 1976

[51] Int. Cl.² .................. B32B 7/00; B32B 17/02; H02K 15/12

[52] U.S. Cl. .................. 310/45; 428/220; 428/268; 428/273

[58] Field of Search .......... 310/45, 271, 270, 260; 428/35, 36, 220, 268, 273

[56] References Cited

U.S. PATENT DOCUMENTS

| 2,793,970 | 5/1957 | Jeppson | 310/271 |
|---|---|---|---|
| 2,896,100 | 7/1959 | Axelson | 310/271 |
| 3,047,756 | 7/1962 | Coggeshall | 310/271 |
| 3,878,017 | 4/1975 | Chapman et al. | 156/272 |
| 3,924,022 | 12/1975 | Schroeter et al. | 427/54 |

Primary Examiner—William R. Dixon, Jr.
Attorney, Agent, or Firm—Vale P. Myles

[57] ABSTRACT

A glass banding for a dynamoelectric machine characterized by incorporating an irradiation curable resin impregnated in pre-stressed layers of the banding. The banding is further characterized by having a substantially uniform thickness of cured resin between each layer thereof, in the range between 0.5 and 2 mils, despite a variation in the pre-stressing tensions applied to the respective layers of the banding. A novel method is also encompassed by the invention for making an adhesively bonded, irradiation curable, resin treated glass banding that retains a pre-stress tension therein when the banding is subjected to a variety of mechanical vibrations and variations in temperatures applied to it.

11 Claims, 4 Drawing Figures

ARMATURE CORE WRAPPED WITH IRRADIATION CURABLE GLASS BANDING

BACKGROUND OF THE INVENTION

The use of glass bandings to hold the component parts of dynamoelectric machine armatures, armature windings and commutators in radial compression is well-known. Typically, such bandings are formed of glass tapes which are impregnated with a thermally curable bonding resin that helps lock the individual filaments of the banding tapes in fixed position within the bandings when the resin is cured. One example of such a thermosetting resin for a glass armature banding is described in U.S. Pat. No. 3,047,756 which issued on July 31, 1962 and is assigned to the assignee of the present invention. As is more fully explained in that patent, in the absence of a suitable bonding resin, the filaments of an armature banding tape would be subjected sequentially to the full tension forces applied to the tape, either one at a time or in small groups of filaments. Under such circumstances the individual filaments would tend to be easily broken thus causing the tape to become completely ruptured. In an attempt to eliminate this problem, it has become an accepted practice to form glass bandings on dynamoelectric machines by pre-stressing or tensioning the bandings as they are applied, then thermally curing the resin impregnated therein in an attempt to lock the individual filaments in a pre-stressed condition that will result in a more uniform sharing of the tension loads placed on the filaments during normal operation of the machine.

While such prior art banding techniques have been reasonably successful, they tend to suffer from two fundamental problems relatively frequently. The basic problem with such thermally cured bandings is that the bonding resins used therein tend to flow during the thermal curing process. This flowing of the bonding resins causes a relaxation of the pre-stress tension and so requires that additional layers of tape be applied in order to obtain the strength necessary for a given application. Of course, there are undesirable added expenses for materials and labor associated with the installation of such additional layers of banding tapes. A second fundamental problem with such prior art glass bandings and banding methods is that the high pre-stressing tensions often used in an attempt to counteract the inevitable relaxation inherent in the flow problem mentioned above sometimes produces a "starved" or dry band. Such a dry band results when too much resin is squeezed from between adjacent layers of a banding tape as it is wound, i.e., before an oven curing operation is performed on the resin to lock it in place relative to the layers of banding tape. Dry bands also are easily ruptured because individual filaments of the tape are free to shift sufficiently to cause them to assume a disproportionate share of the pre-tension loading, which snaps the filaments sequentially.

It would be desirable to provide a glass banding that does not possess the disadvantages potentially inherent in such presently known thermally cured glass bandings. Also, it would be desirable to provide a simplified method for installing glass bandings that would not require the use of large ovens for thermally curing the bandings after they are wound in their installed positions. In particular, it would be very desirable to provide a method for making glass bandings that would enable the bandings to be installed on a dynamoelectric machine while it is mounted on its normal bearings in the machine housing, rather than requiring the disassembly and transportation of the machine to a facility having a curing oven large enough to accommodate the armature and an auxiliary bearing support in order to thermally cure a glass banding wound thereon. While such large furnaces are normally available at manufacturing sites where dynamoelectric machines are initially fabricated, it is often necessary to replace glass bandings on such machines after they have been placed in use, thus, it is often very inconvenient and expensive to be forced to utilize a banding method that requires the use of such a large oven. In fact, at the present time, to effect re-banding of large dynamoelectric machines, it is usually necessary to remove the machines from service and transport them to a large oven in which new thermally-curable glass bandings can be appropriately treated and cured after they are wound in place on the machines.

In addition to the use of heat curable resins on glass armature bandings, in a manner that requires a resin to be cured in place after it has been wound under a suitable pre-stress tension on the armature, it is generally known in the prior art to use ultraviolet or irradiation curable resin materials to form webbings of a type that might be suitable for use in glass banding of armatures, as well as to form protective coatings on various types of electric products. In this regard, U.S. Pat. No. 3,878,019, which issued on Apr. 15, 1975, discloses a process of producing spot bonded non-woven webs by applying a film-forming polymer to web filaments and subsequently cross-linking the polymer by photochemical means. An example of an electrical product that is manufactured by using an irradiation process to cure a resin therein is disclosed in U.S. Pat. No. 2,793,970, which issued on Mar. 29, 1957 and describes a process for making electrical capacitors. In the process taught by this patent, a plurality of sheet electrodes are spaced apart by solid dielectric material in a tank filled with a liquid dielectric chosen from a group of organic monomers which polymerize upon irradiation. These components are contained in a suitable capacitor tank that is subjected to ionizing radiation by rotating the contents of the tank to uniformly expose them to an irradiating beam that is sufficient to cure and solidify the liquid dielectric between the spaced sheet electrodes. A somewhat similar process is shown in U.S. Pat. No. 3,924,022 which issued on Dec. 2, 1975 and is assigned to the assignee of the present invention. In that patent there is described a method for applying an organic coating to a steel sheet that is useful for making laminated products, such as the cores of electrical power transformers. In the process described in the patent, a strip of magnetically oriented steel is first treated with an irradiation curable organic resin to a thickness of up to 2 mils. The treated steel strip is then passed through an irradiation curing zone to effect a cure of the organic resin to a suitable hardness.

Finally, it is generally known to use a variety of different methods for irradiation curing various resins to form hardened coatings. For example, U.S. Pat. No. 3,531,317 which issued on Sept. 29, 1970, explains a process for hardening polyester molding and coating masses by subjecting them to electron radiation. The use of an irradiation-sensitive catalyst precursor to control polymerization of epoxide monomers and prepolymers is described in U.S. Pat. No. 3,721,617 which issued on Mar. 20, 1973. Another patent, U.S. Pat. No.

3,770,490 which issued on Nov. 6, 1973 generally describes a method for curing acrylic syrups that are useful as interior coatings for containers. The method described in that patent utilizes either ionizing irradiation or atomic light to cure the acrylic syrups described therein.

OBJECTS OF THE INVENTION

Accordingly, it is a primary object of the invention to provide a glass banding and method of making same that overcomes the above-mentioned disadvantages and difficulties encountered with prior art banding and manufacturing methods.

Another object of the invention is to provide a dynamoelectric machine having a glass banding that is irradiation curable and is adhesively bonded as the banding is wound on the armature of the machine, rather than requiring an in-place cure thereof by baking the banding in an oven after installation.

Yet another object of the invention is to provide a glass banding that is characterized by having a relatively greater retained tension (compared with thermally cured bandings) and a substantially uniform thickness of resin disposed between adjacent layers of the banding tape.

A still further object of the invention is to provide a method for applying glass banding tapes to a dynamoelectric machine armature and commutator by adhesively bonding and irradiation curing resin on the bandings as they are wrapped around the armature.

A further object of the invention is to provide a method for applying an irradiation curable, resin impregnated glass banding to the armature of a dynamoelectric machine in a continuous manner that allows all layers of the glass banding tape to be substantially smooth, without requiring any tie-off knots or sharp bends at the outer end of the tape.

Additional objects and advantages of the invention will become apparent to those skilled in the art from the description of it that follows taken in conjunction with the accompanying drawings.

SUMMARY OF THE INVENTION

In one preferred form of the invention an irradiation curable resin is impregnated in a glass banding tape that is wound in a plurality of layers to form a fully cured glass banding on the armature of a dynamoelectric machine. The cured resin between adjacent layers of the tape is substantially uniform in thickness and the cured band thus has relatively greater retained tension compared with known prior art methods for applying thermally cured banding tapes on dynamoelectric machines. Somewhat similar glass bandings are applied to the armature winding end turns and to a commutator on the machine in a preferred embodiment of the invention. The preferred form of the method of the invention provides a tensioning device for suitably wrapping a glass banding tape around a rotatably mounted dynamoelectric machine armature without requiring the armature to be removed from its operating housing. The method of the invention also provides a single source of irradiation, such as an ultra-violet lamp, for curing the resin on the glass tape at the time the tape is wrapped on the armature. A heat gun is provided for heating the resin on the tape just before it is applied to the armature to promote a controlled amount of resin flow as the tape is wrapped on the armature.

DESCRIPTION OF THE PREFERRED EMBODIMENTS

Figure 1:
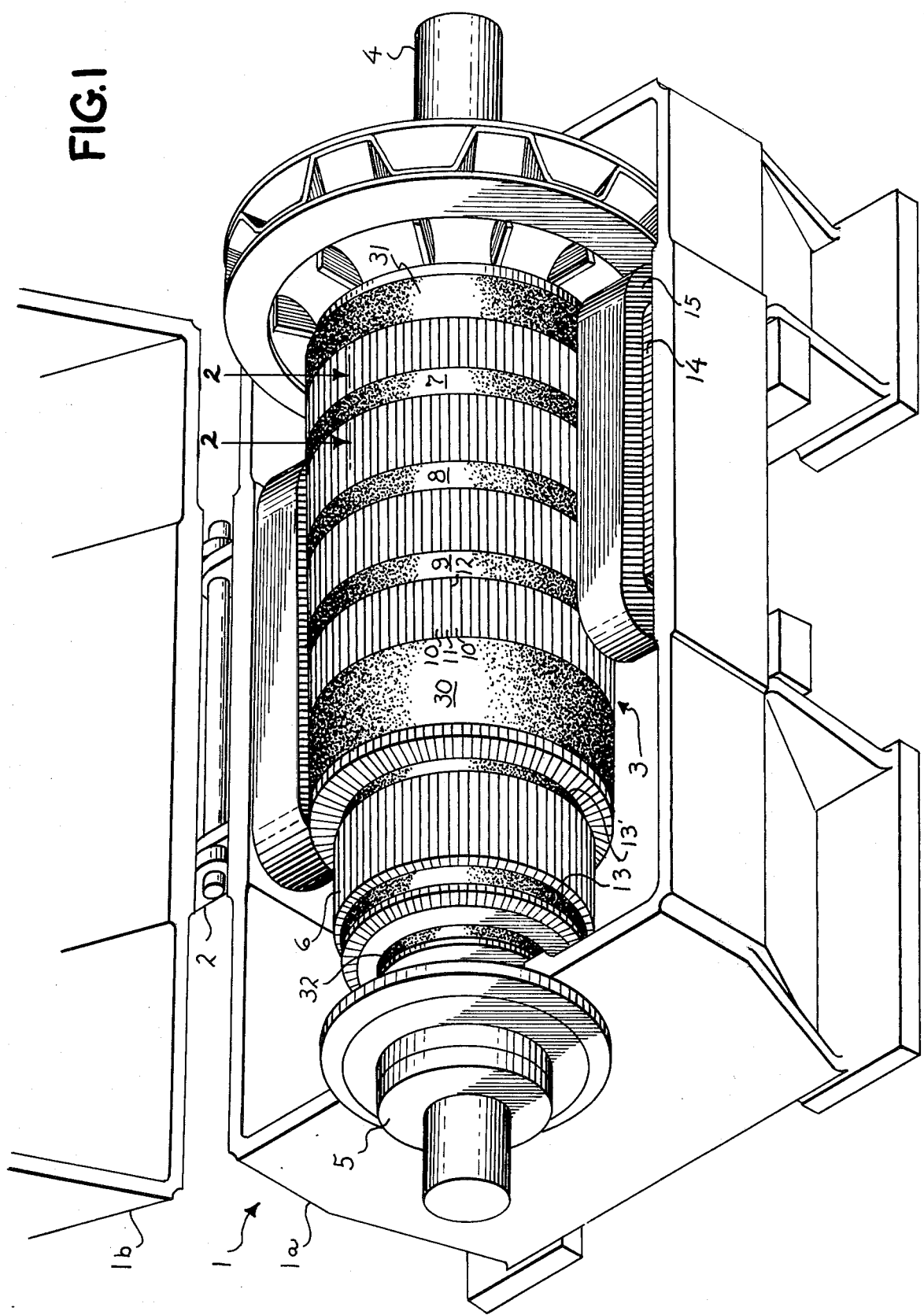
FIG. 1 is a perspective view of a dynamoelectric machine illustrating several irradiation-curable resin treated glass banding tapes disposed respectively around the armature, the armature winding end turns and at selected axially spaced points on the commutator of the machine to lock the component parts of these portions of the machine in position under a desired pre-stress compression force applied to the bandings.

To facilitate a description of the novel features of the invention, a description will first be given of a preferred embodiment of an irradiation curable glass banding made pursuant to the invention, then a description will be given of a preferred method for applying a glass banding tape to a dynamoelectric machine armature pursuant to the teaching of the invention. In addition, a preferred banding technique for manufacturing an entire dynamoelectric machine will be described to demonstrate the flexibility and wide range of application of my invention. Accordingly, refer first to FIG. 1 of the drawings which illustrates a commercially available type of split-shell dynamoelectric machine 1 having a bottom housing half shell 1A and a top housing half shell 1B that are hinged together by a hinge 2 so that the top shell can be pivoted to lift it away from the rotatably mounted armature 3, thereby to expose the armature for maintenance purposes, in the manner indicated in FIG. 1. As is typical, the armature 3 is mounted on a shaft 4 which is journaled in bearings at the opposite ends of the housing. Only one of these bearings is shown and designated by the reference numeral 5 in FIG. 1. A multiple-bar, generally cylindrically shaped commutator 6 is also supported for rotation on the shaft 4 about its longitudinal axis in any suitable well-known manner. Pursuant to the present invention, a plurality of irradiation cured glass bands 7, 8 and 9 are wrapped around a plurality of conventionally stacked magnetic laminations 10 and an energizing armature winding 11 is wound in slots 12 formed in the laminated stack of the magnetic armature core. Further detailed description of the characteristic features of the glass bandings 7, 8 and 9 will be given below, but at this point it should be noted that the armature also includes a pair of glass armature winding end-turn banding tapes 30 and 31 positioned respectively around the end turns extending from opposite sides of the armature core 10. Another pair of glass commutator banding tapes 13 and 13' are wound around the outer ends of the commutator bars 6 to support them in a desired, radially compressed position pursuant to the teaching of the invention. Finally, a multi-layer glass string banding tape 32 is wound around the outermost ends of the bars of commutator 6 to provide protection for the end of the commutator.

Except for the structure and general nature of the glass bandings 7, 8, 9, 13, 13', 30, 31 and 32, just mentioned, the other components of the machine 1, as thus far described, may take any conventional dynamoelectric machine form insofar as they are referred to herein for the purpose of explaining my invention. Similarly, a relatively conventional pole structure 14 and associated pole coil 15 mounted by suitable well-known means, along with other cooperating pole and pole coil structures, will, of course, be utilized to complete the generally typical dynamoelectric machine structure relative to which the glass bandings of the preferred embodiment of the invention are oriented in the form of the invention described herein.

Turning now to a detailed consideration of the unique glass bandings 7, 8, 9, 13, 13', 30, 31 and 32 of the invention, it will be recognized by those skilled in the art of manufacturing dynamoelectric machines that such bandings should possess two inherent characteristics. First, they should be able to retain predetermined desirable tensions in the bandings in order to apply pre-established compressive forces on the commutator bars 6 and the windings 11 that are disposed beneath the respective bandings, as shown in FIG. 1. Also, the bandings must possess sufficient strength and longevity to withstand the substantial centrifugal forces and mechanical vibrations to which they will be subjected by normal operation of the machine. In addition to these preferred characteristics, it would be desirable to have the bandings constructed in a manner such that the resins in them do not flow and relax tension in the filaments of the glass banding tapes as they are being cured on the machine. Any such relaxation could possibly allow sufficient movement of the parts restrained by the bandings to cause undesirable effects during subsequent operation of the machine.

Figure 2:
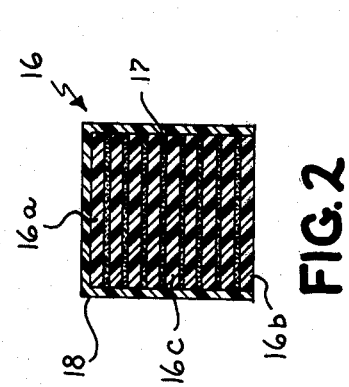
FIG. 2 is a cross-sectional view through one of the glass bandings, along the plane 2—2, shown in FIG. 1, illustrating the respective layers of glass banding tape and layers of irradiation-cured bonding resin disposed therebetween.

It has been found that a desirable characteristic feature of such durable and suitably strong bandings is that they must have a stable, fully cured resin composition in them to a predetermined thickness between each adjacent layer of the glass banding tapes used to make-up the respective bandings. To better illustrate this characteristic arrangement of the preferred embodiment of the invention, there is shown in FIG. 2 of the drawing a cross-sectional view that may be taken through any of the bandings mentioned above and illustrated in FIG. 1, but for sake of discussion herein, is a cross-section view of the core banding. It will be understood that the armature end-turn bandings and the commutator bandings formed pursuant to the teaching of the invention will have similar dispersions of the resins impregnated therein.

As illustrated in FIG. 2, the core banding 7 comprises a glass banding tape 16 which is wrapped in multi-layer fashion around the laminations of magnetic core 10 and windings 11 of the armature (as seen in FIG. 1) to exert a radially compressive force on the core. Between each adjacent layer of the tape 16 there is disposed a predetermined thickness of irradiation cured resin 17 to lock the respective layers of tape in a fixed space relationship with a predetermined pre-stress maintained in each filament of the tape. It should be understood that this desired thickness of resin between the tape layers is afforded by the unique method of my invention which is described in detail below. As will become clear from a study of the method, the entire tape 7 is impregnated with resin so that resin will permeate the interstices of the glass tape, as well as being disposed in layers between the layers of tape, as shown in FIG. 2.

In the interest of simplifying the description of the cross-sectional view of glass core banding 7 (as shown in FIG. 1) reference numerals 16A, 16B and 16C are shown to specifically identify, respectively, only the outermost, the innermost and one of the intermediate layers of the banding tape 16, at the cross-sectional plane indicated by FIG. 2. Similarly, only one layer of the irradiation curable resin 17 between two of the adjacent layers of the banding tape 16 is identified by number in FIG. 2. It will be appreciated that the resin layer 17 is continuous and generally spiral in form with extensions through or into the interstices to the tape layers as the description of the preferred method of the invention is presented. At this point in the discussion of the invention, it is only necessary to recognize that it has been found important to maintain the range of thickness of that portion of the irradiation curable resin 17 between adjacent layers of the glass banding tape 16 in the range of about 0.5 mils to about 2 mils in order to best afford the desired objectives of the invention.

A suitable glass banding tape for the tape 16 (and for the tapes used to form the other bandings 8, 9, 13, 13', 30, 31 and 32) has been found to be a glass tape having type number A22L11E which is available from the Laminated and Insulating Materials Business Department of General Electric Company, located in Schenectady, N.Y. That particular type number generally references a 30-end, i.e., 30 filament, glass yarn ⅜ inch in width. Wider glass tape having similar tensile characteristics may be used to form certain bandings such as the wide end-turn bandings 31 and 32. However, in the preferred embodiment being described, the end-turn bandings 31 and 32 are formed by using the above-referenced ⅜ inch wide tape and half-lapping it as the tape is wound to thereby provide tape coverage over a band that is 3 to 5 inches in width. In order to make the layer of resin 17 [and the remainder of the resin impregnated in the banding tapes (16)] irradiation curable, a suitable resin to use for this purpose has been found to be one sold under the reference number 3405 by the Laminated and Insulating Materials Business Department of General Electric Company located in Schenectady, N.Y. That basic resin is of a generic type of resinous materials known as unsaturated polyester resins which are dissolved in the reactive diluent diallyl phthalate and is caused to solidify through the action of a peroxide catalyst and should be modified with 1.5% di-tertiary-butyl diperphthalate and with 2% Trigonal 14 (which is a Benzoin alkylether, commercially available from Noury Chemical Corporation of Burt, N.Y.). Of course, other irradiation curable resins may be used to provide the unique irradiation curable resin treated glass banding of my invention, which is characterized by having the above-identified spacing and locking features relative to the adjacent layers of each banding tape, such as the tape 16. For example, a suitable alternative epoxy formulation catalyzed with a tri-aryl sulfonium salt of antimony hexafluoride has the following composition: 60 parts by weight cycloalaphatic epoxy resin available from CIBA Manufacturing Company of Ardsley, N.Y. under Type #CY179, mixed while heated with 2 parts by weight of a suitable catalyst, and further mixed after cooled to under 25° Celsius with epoxy resin Type #152 available from Shell Oil Company of Houston, Tex. If desired, a suitable pre-impregnated tape prepared for ultra-violet curing can be obtained commercially from Laminated and Insulating Materials Products Department of General Electric Company located in Schenectady, N.Y. by ordering Type #1211TX which identifies a ⅜ inch wide, 30 end 75½ yarn impregnated to between 21 and 28 percent by weight with a UV curable resin described generally as unsaturated polyester resin based on fumaric and endomethylene, tetrahydro, phthalic anhydrides reacted with propylene glycol, incorporating acrylated and methacrylated monomers, a vinyl resin as a wet strength toughener, and curing agents consisting of a peroxyester and a benzoin alkyl ether.

A further characteristic feature of the preferred embodiment of the glass banding of the invention, as it is shown, for example, in FIG. 2, is that a majority of the layers of the tape 16 in the core banding 7, including the outermost layers thereof, are locked by the cured resin 17 under a pre-stress tension in the range of 200 to 225 pounds so that this desired tension is uniformly distributed between each of the individual glass filaments of the banding tape. In this regard, the banding of the invention is importantly distinguished from prior art, thermally cured glass bandings in that the pre-stress tension is essentially completely retained in the bandings, wherein thermally cured bandings tended to relax, as explained above, causing eventual cascade-rupture of the invididual filaments, as they are forced to assume too great a share of the pressure retained by the banding. At this point it can be pointed out that the pre-stressing tension force preferably applied to the end-turn bandings 31 and 32 as they are wound, pursuant to the invention, is in the range of about 150 to 225 pounds.

Another important feature of each of the glass bands 7, 8, 9, 13, 13', 30, 31 and 32 of the invention is that the two innermost layers 16B and 16B' of the banding tape 16 are wrapped around the core laminations, the winding end turns or the commutator bars, respectively, without having any substantial pre-stress tension applied thereto. Similarly, while a relatively uniform pre-stress tension in the range of 200 pounds is applied to the intermediate layers of a typical ⅜ inch wide banding tape outward from the two innermost layers to within the last few layers of the banding, pursuant to the invention, the outermost layers, i.e., the outer 1 to 5 layers of each banding are wound with a reduced tension in a range descreasing to about 50 pounds. Finally, characteristic of the present invention, the outermost layer 16A of the tape 16 is formed so that the end thereof is substantially free of tie-off type bends of knots. In practicing prior art banding methods it is normally necessary to loop the outer tail end of each banding tape under one or more of the adjacent inner taper layers, to form knots suitable to secure the tape in position until it is subsequently cured in an oven. Such tie-off procedures are obviated with the banding of the invention because the irradiation cured resin 17 is adhesively bonded as the banding is formed, in the manner that will be described more fully below, so that no tie-off is needed. Thus, a completely smooth, readily terminated tape ending is formed on each banding pursuant to the invention.

Because it is normally desirable to hold the commutator bars 6 in compression, but with more overall mechanical stress than is needed on the core bandings 7, 8 and 9, in the preferred embodiment of the invention the commutator banding 13 and 13' are formed of ten to seventy layers of glass banding tape, whereas the respective armature bandings 7, 8 and 9 will preferably have five to sixteen individual layers of tape, as generally shown in FIG. 2. The multi-layered glass commutator banding tapes 13 and 13' positioned around the opposite ends of the commutator 6 to exert a radially compressive force on the bars thereof that are electrically connected to the energizing windings 11, is characterized, as indicated above, by having an irradiation cured resin coated on each layer of the tape used to form the bandings. Similarly, pursuant to the present invention the thickness of the resin between the adjacent layers of the glass tape used to form commutator bandings 13 and 13' will be in the range of about 0.5 mils to about 2 mils. Preferably, however, the bandings 13 and 13' are wound under a pre-stress tension in the range of about 300 pounds, rather than being wound at the somewhat lower pre-stress tension used for the bandings 7, 8 and 9, as described above, (assuming a ⅜ inch wide tape is used in both instances).

At this point it should be recognized that in some applications additional bandings may be mounted at other selected axially spaced points along a given commutator or armature to satisfy the needs of certain other applications of the invention. It will also be apparent as the method of the invention is discussed in detail below that the end-turn bandings 30 and 31 and the string banding 32 will be applied in a manner similar to that used to apply the core banding tapes 7–9; however, the end-turn banding tapes should be applied, per the invention, under a pre-stressing tension in the range of 150 to 225 pounds. The string banding tape 32 which protects the outer end of the commutator, is applied under a tension of less than 50 pounds.

Finally, all of the bandings 7, 8, 9, 13, 13', 30, 31 and 32 are preferably coated with an irradiation cured sealant 18 that is shown covering the outer surface of the resin coated banding tape 16 and the cured resin 17 of the band 7, by way of example, in FIG. 2, to a thickness in the range of 0.5 to 10 mils. In the form described herein the coating of sealant 18 comprises an ultra-violet (UV) light curable resin composition that is commercially available from Laminated and Insulating Materials Products Department of General Electric Company, of Schenectady, New York by designation Type #111-093, which identifies a suitable polyester resin to which 3 percent by weight of Trigonal-14 photosensitizer is added. The sealant coating 18 should be cured by exposure to irradiation for about 2 minutes. This curing operation is preferably effected by sequentially exposing portions of the coating to the irradiation zone of lamp 23, as the armature 3 is jogged forward, or rotated, as more fully described below.

The foregoing description generally illustrates the characteristic features of the preferred form of the invention. Now, in order to more fully describe the above-mentioned preferred method for applying a glass banding tape to a dynamoelectric machine armature pursuant to the invention, reference will be made to FIGS. 3 and 4 of the drawing. As indicated generally at the outset, a particular advantage of the method of the invention is that it can be used to apply a glass banding to an armature either in a factory environment where large turntables or lathes are readily available to mount and rotate armatures, or with equal facility in field installations where it is desirable to wrap new glass banding around an armature without removing it from its bearings in a motor housing. In particular, with the method of the invention, as will be seen hereafter, it is not necessary to pre-heat either a commutator or the armature laminations prior to application of banding tapes thereto; unlike the procedures that are now conventional when thermally cured resins are used to form glass bandings on such machines. Of course, by avoiding the need for pre-heating and final baking ovens it is possible to quickly and relatively simply apply glass bandings at field locations where access to such ovens is ordinarily difficult to come by. A directly related advantage of avoiding the need for pre-heating the armature and commutator is that the large heat sink problem encountered in heating such masses of metal is completely avoided with the irradiation-cured, adhesive-bonding method of the present invention. As also indicated above, higher retained tensions are achieved with UV cured bands because the banding resin is not squeezed out of the banding during curing thereof, as occurs with heat cured bandings. Finally, as will be explained in detail below, it is possible to cure a banding tape with the method of the present invention by sequentially curing separate sections of it, rather than having to cure the entire banding at one time in an oven; thus, it is possible to employ a relatively small localized source of irradiation, such as a battery of ultraviolet lamps, to provide all the irradiation needed for curing the resin of the banding as the banding tape is applied to a machine.

Figure 3:
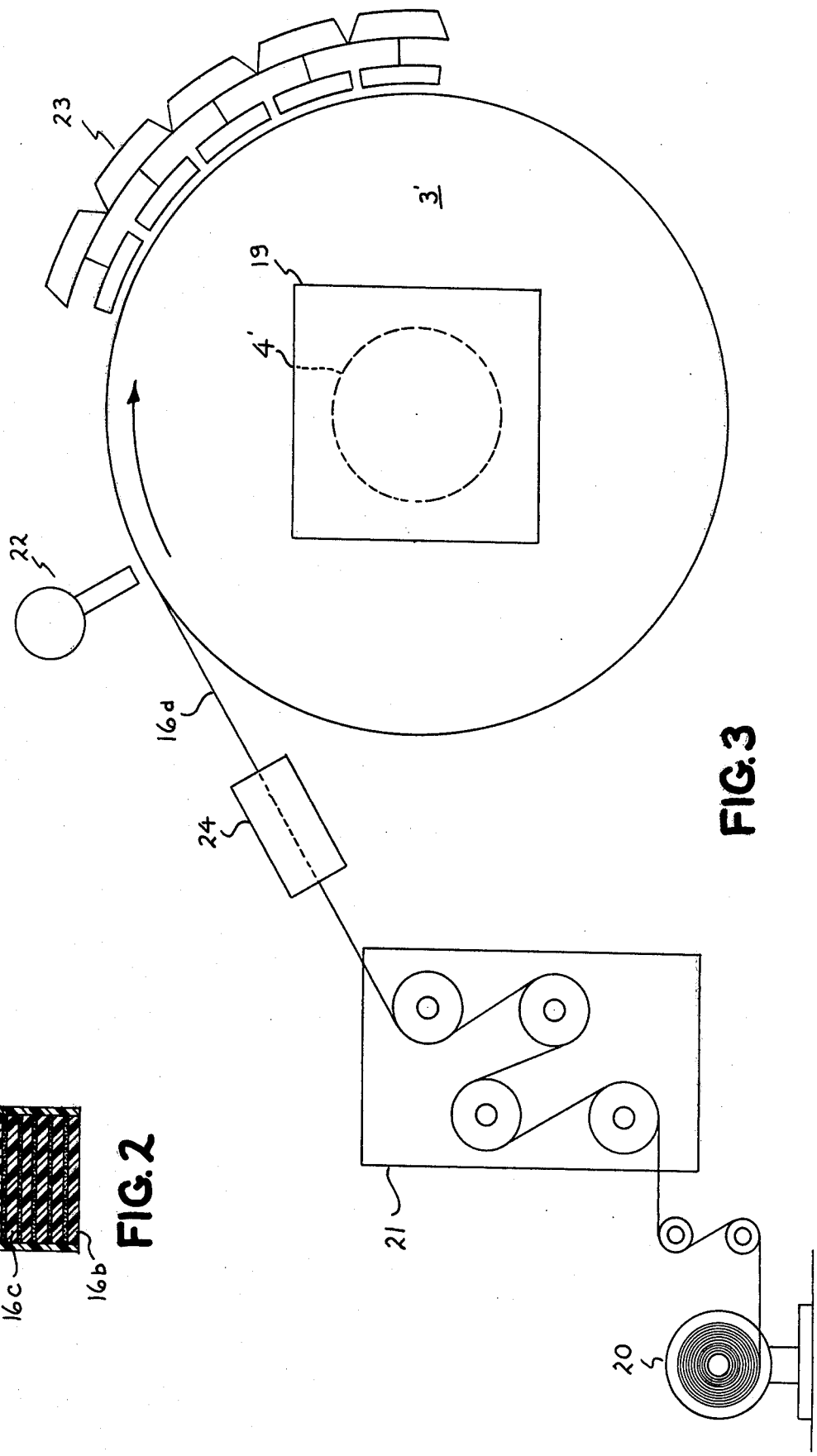
FIG. 3 is a schematic diagram of a preferred form of apparatus used in practicing the novel method of the invention.

Referring now to FIG. 3 of the drawing, it will be seen that there is shown in schematic form a preferred assembly for practicing one embodiment of the method of the invention. Thus, in FIG. 3 there is schematically illustrated a dynamoelectric machine armature 3', which may be the same as the armature 3 shown in FIG. 1. Accordingly, it will be understood that the armature may be mounted in its normal operating bearings in a conventional housing, such as the split-shell 1A/1B housing illustrated in FIG. 1, or an alternative rotatable mounting means may be employed. A conventionally available, suitable drive means 19, which may take the form of a reduction gear electric drive train or other suitable mechanically operated means, is coupled to the armature shaft 4' (such as the shaft 4 in FIG. 1) to rotate the armature 3' at a controlled rate. A length of glass banding tape 16D is provided on a rotatably mounted spool 20 and threaded through a suitable conventional, commercially available tensioning device 21. The heat gun, used in this form of the invention, is operable to raise the temperature of the tape 16D to around 120° Celsius just before it is wrapped around the armature 3'. Finally, a source of irradiation is provided by a bank of ultraviolet lamps 23, that are spaced between one and three inches from the circumference of the armature 3'. In this form of the invention the bank of lamps 23, which hereafter will be referred to simply as the lamp, comprises six individual H3T7 model lamps (available from General Electric Company at Nela Park, Cleveland, Ohio) of the medium-pressure mercury type, ballasted to produce approximately 150 watts of radiant energy per linear inch. The individual lamps are arranged as close together as possible around the periphery of the armature 3' and preferably cover approximately 30° of the arcuate surface thereof in a strip about 5 inches wide, i.e., extending about 2 inches beyond the sides of the tape 16D.

In order to accurately control the tension at which the length of banding tape 16D is applied to the armature 3', a suitable commercially available tensiometer 24 is operatively coupled in well-known manner to sense the tension in the tape as it is stretched between the armature 3' and the tensioning device 21. With this apparatus, it is possible to practice the preferred method steps of the invention as they are generally outlined in FIG. 4 of the drawing, to which reference may now be made.

Figure 4:
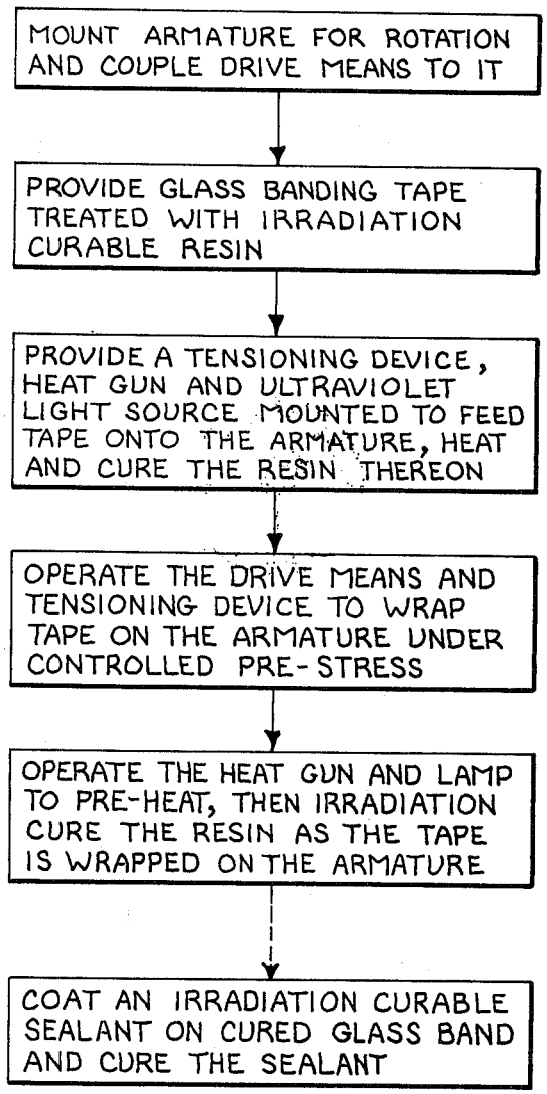
FIG. 4 is a chart briefly outlining the preferred steps of the method of the invention.

As indicated in FIG. 4, pursuant to the method of the invention, a glass banding tape is applied to a dynamoelectric machine armature, by first mounting the armature for rotation about its longitudinal axis and coupling a drive means 19 to it for rotating the armature at a controlled speed. It should be understood at this point that the drive means should be operated to rotate the armature in a range of speeds from around one revolutions per minute to ten revolutions per minute, but it should also be able to jog the armature to rotate it in steps so that prolonged periods of irradiation can be applied to sections of the tape 16D, if desired. After the glass banding tape 16D is provided with an irradiation curable resin, for example by impregnating the tape with the above-mentioned ultraviolet curable resin available from the Laminated and Insulating Materials Business Department of General Electric Company, the tape is fed through the tensioning device 21 and the tensiometer 24 and two layers of the tape are wrapped around the armature 3' under essentially no pre-stress tension. The heat gun 22 is mounted about two inches away from the tape 16D at a point where the tape first engages the armature 3'. Of course, the lamp 23 will be connected to a suitable source of electric power (not shown) and energized to irradiate ultraviolet light on the irradiation-curable resin impregnated on the glass tape 16D sufficient to cure the resin during the interval of time that it passes under the lamp 23. It has been found that the resin should be exposed to the irradiation area of lamp 23 for between ten and twenty seconds to obtain a complete cure of each layer of the resin as the tape passes under the lamp. The drive means 19 must be regulated to achieve such exposure; thus, the drive means is so operated and the tensioning device 21 is controlled to wrap a plurality of layers of the glass banding tape 16D on the armature 3, (after the initial two layers are applied) at a tension of approximately 200 pounds, assuming that the width of the banding tape is about ⅜ inch and that it is 30-end glass tape. Of course, if wider tape, such as ¾ inch tape is used, a tensioning pressure of approximately 400 pounds will preferably be used in practicing the method of the invention to afford a desirably uniform tensioning pre-stress in the intermediate layers of the banding tape. As the banding tape is being wound on the armature 3', the heat gun 22 is operated to blow air heated to about 500° Celcius on the resin and promote flow thereof on the tape before it is passed under the source of irradiation 23.

The foregoing sequence is continued until the desired number of layers of tape 16D are built up to form a banding, such as the 5 to 16 layer bandings 7,8 and 9 shown in FIG. 1 of the drawing. Then, pursuant to an extension of the preferred embodiment of the invention a coat of irradiation curable sealant is applied by brushing, spraying or other suitable means on the cured glass banding and the sealant is, in turn, cured. In this embodiment of the invention curing of the sealant is obtained by operating the drive means 19 to jog or intermittently rotate the armature 3' to sequentially expose the sealant coating to the irradiation zone of lamp 23. Alternatively, it has been found acceptable to rotate the resin under the lamps several times, thereby to provide the total exposure time required for fully curing the resin.

As mentioned above, it is preferable in practicing the method of the invention to operate the tensioning device 21 to apply almost no tension to the banding tape 16D while the first two laps of the tape are wrapped around the armature 3', then the tensioning device is adjusted to apply a pre-stress tension in the range of 200 to 225 pounds of the tape while the next five to 16 layers of the tape are wrapped around the armature. Finally, the tensioning device is adjusted to reduce the pre-stress tension in the tape to about 50 pounds as the outermost (one to five) layers of the tape are wound on the resultant banding, such as the banding 7 shown in FIG. 2.

It will be understood that various modifications in the preferred method of the invention may be made, for example, while it is preferable to energize the heat gun 22 to heat the resin on the tape 16D to a temperature in the range of about 100° Celsius to about 125° Celsius in the preferred form of the invention, if other ultraviolet curable resins than the one described above are used in different forms of the invention it may be found desirable to raise or lower that heat range slightly to afford the desired degree of flow of the resin before it is cured by exposure to the lamp 23. Likewise, while the drive means is preferably operated to rotate the armature 3' at a rate in the range of one to ten revolutions per minute in the method described above, if a larger or more extensive lamp arrangement 23 is used in other embodiments it would be possible to accelerate the rate of rotation and still obtain a complete adhesively cured bond in the resin on tape 16D, rather than requiring the slower speed used with the relatively limited range of light source employed in the preferred embodiment. Corollarially, if the drive means 19 is used to jog the armature 3' thereby to hold the tape under a shorter light source for extended periods of time, obviously the established rate of rotation will be interrupted during such a curing sequence.

To complete the preferred method of the invention, the outermost layer of the banding tape 16D is applied in a substantially smooth, cured position on the armature and a coating of sealant (such as the commercially available sealant described above) is then applied over the outermost layer and cured without utilizing any tie-off knots or bends of the type typically required with prior art, thermally curable resins.

From the foregoing description of the preferred structure and method of the invention it will be apparent to those skilled in the art that various modifications and alternative forms of the invention may be developed from the description of it presented herein; accordingly, it is my intention to encompass within the scope of the following claims the true spirit and scope of the invention.

What I claim as new and desire to secure by Letters Patent of the United States is:

1. In a dynamoelectric machine having a rotatable core having slots with energizing windings disposed therein the improvement comprising banding said slots with an irradiation curable glass band comprising at least one multi-layer glass core banding tape positioned around the core to exert a radially compressive force thereon, and an irradiation cured epoxy or polyester resin impregnated in each layer of the tape to a substantially uniform thickness in the range of about 0.5 mils to about 2 mils between adjacent layers of the band.

2. An improved dynamoelectric machine core banding as defined in claim 1 wherein the majority of layers of tape in said band, including its outermost layers, are locked by said cured resin under a pre-stress tension in the range of about 200 to about 250 pounds.

3. An improved dynamoelectric machine core banding as defined in claim 2 including a second multi-layer glass core banding tape positioned around said core and impregnated with an irradiation cured resin that is dispersed in the same range of thicknesses as the resin on said first glass core banding tape, said first and second core banding tapes being positioned around the core at points spaced respectively inwardly from the ends thereof.

4. An improved dynamoelectric machine core banding as defined in claim 3 including an irradiation cured sealant covering the outer surfaces of said resin coated core bands to a thickness in the range of about 0.5 to 10 mils.

5. An improved dynamoelectric machine core banding as defined in claim 3 including a plurality of commutator bars connected respectively to said energizing windings and arranged to form a generally cylindrically shaped commutator, in combination with a pair of multi-layer glass commutator banding tapes positioned respectively around axially spaced points of the commutator to exert a radially compressive force thereon, and an irradiation cured resin impregnated in each layer of each of said commutator banding tapes to a thickness of about 0.5 mils to about 2 mils between adjacent layers thereof.

6. An improved dynamoelectric machine core banding as defined in claim 5 wherein the majority of layers of said pair of commutator banding tapes, including their outermost layers, are locked by said cured resin thereon under a pre-stress tension in the range of about 275 to about 325 pounds.

7. An improved dynamoelectric machine core banding as defined in claim 6 wherein all but the two innermost layers of each of said banding tapes are locked in said respective ranges of pre-stress tension by the cured resin thereon.

8. An improved dynamoelectric machine core banding as defined in claim 7 wherein the outermost one to five layers of each banding tape are locked by the resin thereon at a pre-stress tension that is less than the pre-stress tension in all the inner layers of tape but for those having essentially no pre-stress tension locked therein.

9. An improved dynamoelectric machine core banding as defined in claim 3 wherein the outermost layers of each of said banding tapes, including the ends thereof, are substantially free of tie-off type bends and knots.

10. An improved dynamoelectric machine core banding as defined in claim 9 including a pair of multi-layer glass end-turn banding tapes positioned respectively around opposite ends turns of the core winding to exert a radially compressive force thereon, and an irradiation cured resin dispersed on each layer of said end-turn banding tapes to a thickness of about 0.5 to about 2 mils between adjacent layers of the tape.

11. An improved dynamoelectric machine core banding as defined in claim 10 wherein each of said end-turn banding tapes is locked by the cured resin thereon under a pre-stress tension in the range of about 150 to about 225 pounds, and including a multi-layer glass string banding tape positioned around the outermost end of the commutator bars to exert a radially compressive force thereon, and an irradiation cured resin impregnated in each layer of said string banding tape to a thickness of about 0.5 to about 2 mils between adjacent layers thereof, said string banding tape being locked by the cured resin thereon under a pre-stress tension in the range of about 25 to about 50 pounds.

* * * * *